US009698489B2

(12) United States Patent
Lo Hine Tong et al.

(10) Patent No.: US 9,698,489 B2
(45) Date of Patent: Jul. 4, 2017

(54) COMPACT SLOT ANTENNA

(71) Applicant: THOMSON LICENSING, Issy de Moulineaux (FR)

(72) Inventors: Dominique Lo Hine Tong, Rennes (FR); Kevin Nadaud, Reze (FR); Philippe Minard, Saint Medard sur Ille (FR); Francois Baron, Thorigne-Fouillard (FR)

(73) Assignee: THOMSON LICENSING, Issy les Moulineaux (FR)

( * ) Notice: Subject to any disclaimer, the term of this patent is extended or adjusted under 35 U.S.C. 154(b) by 318 days.

(21) Appl. No.: 14/059,701

(22) Filed: Oct. 22, 2013

(65) Prior Publication Data
US 2014/0111393 A1    Apr. 24, 2014

(30) Foreign Application Priority Data

Oct. 23, 2012  (FR) .................................... 12 60064

(51) Int. Cl.
*H01Q 13/10*    (2006.01)
*H01Q 13/16*    (2006.01)
*H01Q 21/28*    (2006.01)

(52) U.S. Cl.
CPC ........... *H01Q 13/106* (2013.01); *H01Q 13/16* (2013.01); *H01Q 21/28* (2013.01)

(58) Field of Classification Search
CPC ........ H01Q 13/16; H01Q 7/00; H01Q 13/106; H01Q 21/28
(Continued)

(56) References Cited

U.S. PATENT DOCUMENTS 5,914,693 A *  6/1999  Takei .................... H01Q 13/16
                                                343/700 MS
6,028,561 A *  2/2000  Takei .................. H01Q 13/103
                                                343/700 MS (Continued)

FOREIGN PATENT DOCUMENTS

CN        1298080         1/2007
CN        102074794       5/2011
(Continued)

OTHER PUBLICATIONS

Translation of Masuda JP 2007-155597.*
(Continued)

*Primary Examiner* — Dameon E Levi
*Assistant Examiner* — Ab Salam Alkassim, Jr.
(74) *Attorney, Agent, or Firm* — Brian J. Dorini; Patricia A. Verlangieri

(57) ABSTRACT

The present invention relates to a compact slot antenna formed, in a multilayer substrate comprising, in order, at least one first conductive layer, a first dielectric layer, a second conductive layer, a second dielectric layer and a third conductive layer, of a first slot-line realized in the second conductive layer, said first slot-line being connected to the supply of the antenna, of a second and a third slot-lines realized respectively in the first and in the third conductive layers, the second and third slot-lines each being delimited by two conductive strips of which a first extremity, supply side, is interconnected by a via passing through a window realized in the second conductive layer and a second extremity connected to the second conductive layer, both conductive strips on the side of the second extremity being, either in open circuit, or in short circuit, the electrical length of the first, second and third slot-lines being a function of the wavelength at the operating frequency of the antenna.

7 Claims, 5 Drawing Sheets

(58) Field of Classification Search
USPC .................................................. 343/770, 767
See application file for complete search history.

(56) References Cited

U.S. PATENT DOCUMENTS

| | | | |
|---|---|---|---|
| 6,727,855 B1 * | 4/2004 | Nalbandian | H01Q 9/0421 343/700 MS |
| 6,870,505 B2 | 3/2005 | Aisenbrey | |
| 2001/0015705 A1 * | 8/2001 | Scordilis | H01Q 1/244 343/845 |
| 2003/0107518 A1 | 6/2003 | Li et al. | |
| 2005/0057412 A1 | 3/2005 | Hwang et al. | |
| 2011/0279190 A1 | 11/2011 | Liu et al. | |
| 2012/0092224 A1 | 4/2012 | Sauleau et al. | |
| 2015/0364823 A1 * | 12/2015 | Hashimoto | H01Q 1/38 343/700 MS |

FOREIGN PATENT DOCUMENTS

| | | |
|---|---|---|
| FR | 2944153 | 10/2010 |
| JP | 5110332 | 4/1993 |
| JP | 5243837 | 9/1993 |
| JP | 2007155597 A * | 6/2007 |

OTHER PUBLICATIONS

Chen et al—CPW-fed folded slot dipole antenna for mobile handset applications—Antennas and Propagation (APSURSI), 2011 IEEE International Symposium on Jul. 3-8, 2011—pp. 1932-1935.

Kwak et al—A Folded Planar Inverted-F Antenna for GSM/DCS/Bluetooth Triple-Band Application—Antennas and Wireless Propagation Letters, IEEE (vol. 5, Issue 1)—pp. 18-21—Dec. 2006.

Deal et al—A broadband microstrip-fed slot antenna—Technologies for Wireless Applications, 1999. Digest. 1999 IEEE MTT-S Symposium on Feb. 21-24, 1999—pp. 209-212.

Tekkouk et al—Folded Rotman lens multi beam antenna in SIW technology at 24 GHz—Antennas and Propagation (EUCAP), 2012 6th European Conference on Mar. 26-30, 2012—pp. 2308-2310.

Chen et al—Monopole slot antenna design for WLAN MIMO application—Microwave and Optical Technology Letters | vol. 54, No. 4, pp. 1103-1107 | Apr. 2012.

Search Report Dated Jun. 21, 2013.

Chen et al., "CPW-fed Folded Slot Dipole Antenna for Mobile Handset Applications", 2011 IEEE International Symposium on Antennas and Propagation (APSURSI), Spokane, Washington, USA, Jul. 3, 2011, pp. 1932-1935.

Kwak et al., "A Folded Planar Inverted-F Antenna for GSM/DCS/Bluetooth Triple-Band Application", IEEE Antennas and Wireless Propagation Letters, vol. 5, No. 1, Dec. 2006, pp. 18-21.

Deal et al., "A Broadband Microstrip-Fed Slot Antenna", 1999 IEEE MTT-S Symposium on Technologies for Wireless Applications, Vancouver, British Columbia, Canada, Feb. 21, 1999, pp. 209-212.

Tekkouk et al., "Folded Rotman Lens Multibeam Antenna in SIW Technology at 24 GHz", 2012 6th European Conference on Antennas and Propagation (EUCAP), Prague, Czech Republic, Mar. 26, 2012, pp. 2308-2310.

Chen et al., "Monopole Slot Antenna Design for WLAN MIMO Application", Microwave and Optical Technology Letters, vol. 54, No. 4, Apr. 2012, pp. 1103-1107.

* cited by examiner

COMPACT SLOT ANTENNA

This application claims the benefit, under 35 U.S.C. §119 of French Patent Application 1260064, filed Oct. 23, 2012.

TECHNICAL FIELD

The present invention relates generally to a compact slot antenna. It relates more particularly to compact slot-antennas realised in a multi-layer substrate.

TECHNOLOGICAL BACKGROUND

In the wireless communications field, increasing use is frequently made of MIMO (Multiple Input Multiple Output) circuits in order to increase the capacity of the transmission circuits and improve the operation of the entire system. The use of MIMO circuits generally leads to an increase in the number of antennas to be realised for a single board. Moreover, to facilitate the integration of the circuits, the antennas are now produced directly on the printed circuit board or PCB. However, in application of the laws of physics, the length of an antenna is a function of the wavelength. Hence, to be able to operate in WiFi, that is for example in the frequency band of 2.4 GHz, the length of a slot antenna as a function of λg is several tens of millimeters. This length is not negligible when the antenna must be integrated on printed circuit boards used in mass production. Moreover, the printed circuit boards are most often constituted by substrates with a multilayer structure.

Hence, to produce a compact slot antenna using the multilayer structure of the substrate, the most natural idea consists in folding the slot-line in the manner shown in FIGS. 1 and 2.

In FIG. 1, a cross sectional view has been shown diagrammatically of a substrate with two dielectric layers d1, d2 and with three conductive layers M1, M2, M3. To produce a compact slot antenna in this type of substrate, a slot-line was etched successively in the conductive layer M3, as shown by the slot-line 1. Then, after passing through the dielectric layer d2, the slot-line continues by a slot-line 2 produced in the conductive layer M2. It then passes through the dielectric layer d1, and it continues by a slot-line 3 produced in the conductive layer M1. The supply point 4 of the slot antenna is formed at the level of the slot-line 1. This supply is realised in a standard manner by electromagnetic coupling, according to the technique known as "Knorr". In this case, the three slot-lines 1, 2, 3 are superimposed and they have a total electrical length, between the supply point 4 and the short circuit extremity of the slot-line 3, equal to λg/2 where λg is the guided wavelength in the slot at the operating frequency.

A more detailed representation of a doubly folded slot antenna, such as the one in FIG. 1, is given by the perspective view of FIG. 2. In this case, only the parts of the conductive layers M1, M2, M3, necessary for a correct understanding of the invention, are shown. Hence, the slot-line 1 was etched in the lower conductive layer M3, this slot being in open circuit at one extremity, the other extremity not shown being coupled to the supply line. Moreover, a slot-line 2 was etched in the conductive layer M2 that is delimited by two conductive strips B2, B'2 that, in the embodiment shown, have an L-shape. Next, in the conductive layer M1, was produced a third slot-line 3 delimited by two conductive strips B3, B3', also in an L-shape. The two conductive strips B3 and B3' have on one side an extremity in short-circuit, as shown by the conductive strip B"3.

Moreover, the conductive strips B3 and B2 are interconnected on the side of the supply point extremity by a via V1 itself connected to an isolated element of the conductive layer M3. Likewise, two conductive strips B'3, B'2 are connected to an isolated element of the conductive layer M3 by a via V'1.

Moreover, as shown in FIG. 2, the other opposite extremities of the strips B2 and B'2 delimiting the slot-line 2 in open circuit, are connected by vias V2 and V'2, respectively to the conductive layer M3 and to two isolated elements of the conductive layer M1 realised in the continuation of layers B3 and B'3. As shown in FIG. 2, the three slot-lines 1, 2, 3 are superimposed.

An antenna of this type whose electrical length of the three slot-elements 1, 2, 3 between the supply point and the open circuit extremity of the slot 3 is equal to λg/2, has been simulated for a WiFi operation, that is in the band of the 2.4 GHz. The simulation was made using the electromagnetic simulator Momentum d'Agilent, by using FR4 substrates as substrate with metallization levels spaced by 0.5 mm. In this case, the impedance matching curve as a function of the frequency is shown in FIG. 3 for a structure such as the one in FIGS. 1 and 2. This curve has a resonance at a frequency of 2.8 GHz, greater than the frequency of the WiFi band. Moreover, a secondary spurious resonance appears towards the 3.7 GHz, which denotes an atypical behaviour of the slot antenna resulting from such a stacking of slot-lines.

SUMMARY OF THE INVENTION

The present invention thus proposes a new solution for folding slot-lines that enables the multilayer structure of printed circuit boards to be used to produce compact slot antennas enabling the size of the printed circuit board to be limited and/or several antennas to be integrated. This new solution does not have the problems mentioned above.

Hence, the present invention relates to a compact slot antenna formed, in a multilayer substrate comprising, in order, at least one first conductive layer, a first dielectric layer, a second conductive layer, a second dielectric layer and a third conductive layer, of a first slot-line realised in the second conductive layer, said first slot-line being connected to the supply of the antenna, of a second and a third slot-lines realised respectively in the first and in the third conductive layers, the second and third slot-lines each being delimited by two conductive strips of which a first extremity, supply side, is interconnected by a via passing through a window realised in the second conductive layer and a second extremity connected to the second conductive layer, both conductive strips on the side of the second extremity being, either in open circuit, or in short circuit, the electrical length of the first, second and third slot-lines being a function of the wavelength at the operating frequency of the antenna.

The first, second and third slot-lines are superimposed and have a total electrical length as a function of the wavelength λg at the operating frequency of the slot-antenna.

According to a first embodiment, when the electrical length of the first, second and third slot-lines is equal to kλg/2, being an integer, the one of the second or third slot-line is in short circuit.

According to another embodiment, when the electrical length of the first, second and third slot-lines is equal to k'λg/4, k' being an odd integer, one of the second or third slot-line is in open circuit.

Classically, the coupling of the slot-line to the supply of the antenna is realised by electromagnetic coupling with a microstrip line realised either on the first or the third conductive layer according to the technique known under the name of "Knorr" principle.

The present invention relates to a printed circuit board realised on a multilayer substrate comprising at least one slot-antenna realised on the substrate according to the embodiments described below.

The present invention also relates to a terminal incorporating a printed circuit board as described above.

BRIEF DESCRIPTION OF THE DRAWINGS

Other characteristics and advantages of the invention will appear upon reading the description of different embodiments, this description being realized with reference to the enclosed drawings, wherein.

DETAILED DESCRIPTION OF THE DIFFERENT EMBODIMENTS

A description will first be given, with reference to the FIGS. 4 à 6, of two embodiments of a compact slot-antenna of electrical length λg/2, realised on a multilayer substrate.

Figure 4A:
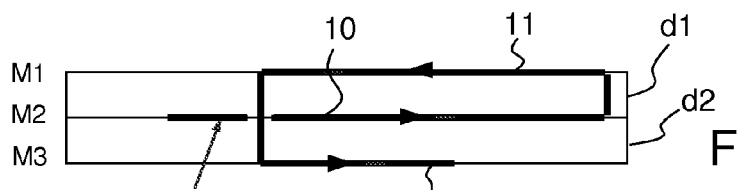
FIGS. 4 (A) and (B) are diagrammatic cross-section views of a first embodiment and a second embodiment of a slot-antenna in accordance with the present invention.

As shown more particularly in FIGS. 4(A) et 4(B), the multilayer substrate is a substrate comprising two dielectric layers d1 and d2 and three conductive layers, respectively M1 the upper conductive layer on the upper face of the dielectric layer d1, M2 the intermediate conductive layer between the dielectric layer d1 and d2 and M3 the lower conductive layer on the lower face of the dielectric layer d2.

Figure 4B:
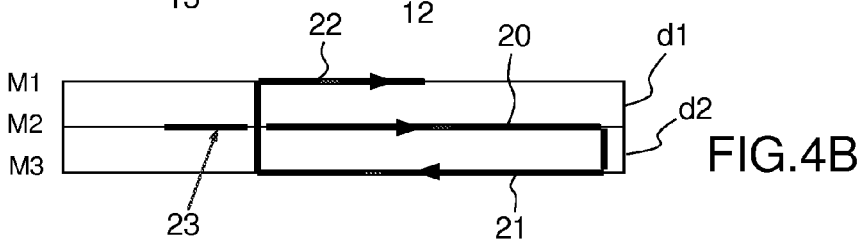

In the two embodiments of FIGS. 4(A) and 4(B), the slot-antenna is first formed by a slot-line 10 etched in the intermediate conductive layer M2 and supplied at the supply point 13 by electromagnetic coupling with a supply line realised in microstrip technology, either on the upper face of the dielectric layer d1 or on the lower face of the dielectric layer d2. The supply mode of the antenna is given only for illustrative purposes.

In the first embodiment, the slot-line 10 continues by a slot-line 11 realised in the upper conductive layer M1 then by a slot-line 12 realised in the lower conductive layer M3, the slot-lines 10, 11, 12 being superimposed and their total electrical length being equal to kλg/2 where λg is the wavelength at the operating frequency.

Figure 5A:
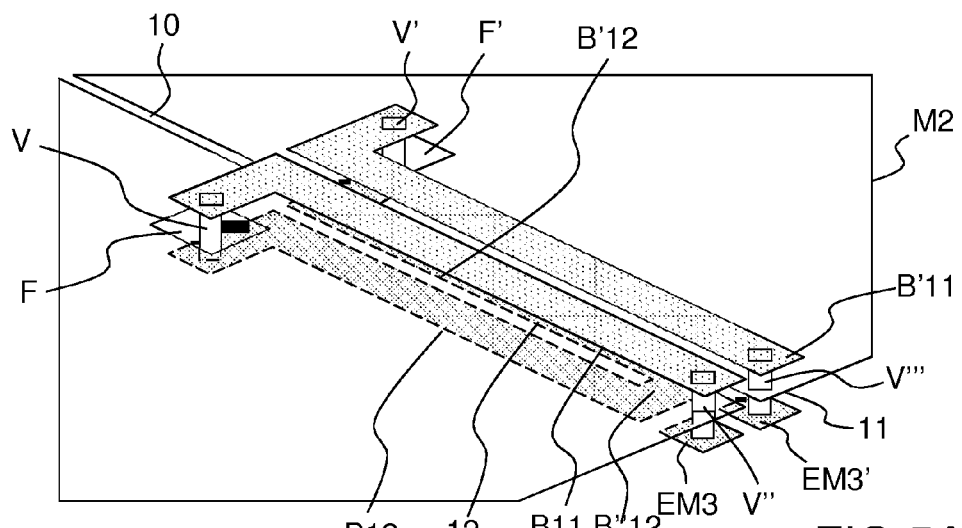
FIGS. 5 (A) and (B) are perspective views of the antennas shown respectively in FIGS. 4(A) and (B).

More specifically, and as shown in FIG. 5(A), the slot-line 11 realised in the conductive layer M1 is delimited by two conductive strips B11 and B'11 that, in the embodiment shown, have an L-shape. Moreover, in the lower conductive layer M3, was realised a slot-line 12 delimited by two conductive strips B12, B'12 having an L-shape. These two conductive strips B12 and B'12 are interconnected by a conductive strip B"12 such that the slot-line 12 ends in a short-circuit. Moreover, to obtain a radiating slot-line, the different conductive strips are interconnected in the following manner.

As shown in the FIG. 5(A), the intermediate conductive strip M2 has, on each side of the slot-line 10, supply side, two windows F, F' through which pass two vias V, V' respectively connecting one of the extremities of the conductive strip B'12 to the corresponding extremity of the conductive strip B11 and one of the extremities of the conductive strip B'12 with the corresponding extremity of the conductive strip B'11. Moreover, the free extremity of the conductive strip B11 is connected through a via V" to the conductive layer M2 and to an isolated element EM3 of the conductive layer M3 in the continuation of the conductive strip B12. Likewise, the extremity of the conductive strip B'11 is connected to the intermediate layer M2 and to an isolated element EM3' of the conductive layer M3 located in the continuation of the conductive strip B'12. This enables a connection to be obtained between the different slot-lines 10, 11, 12 as shown by the arrows in FIG. 4(A).

Figure 5B:
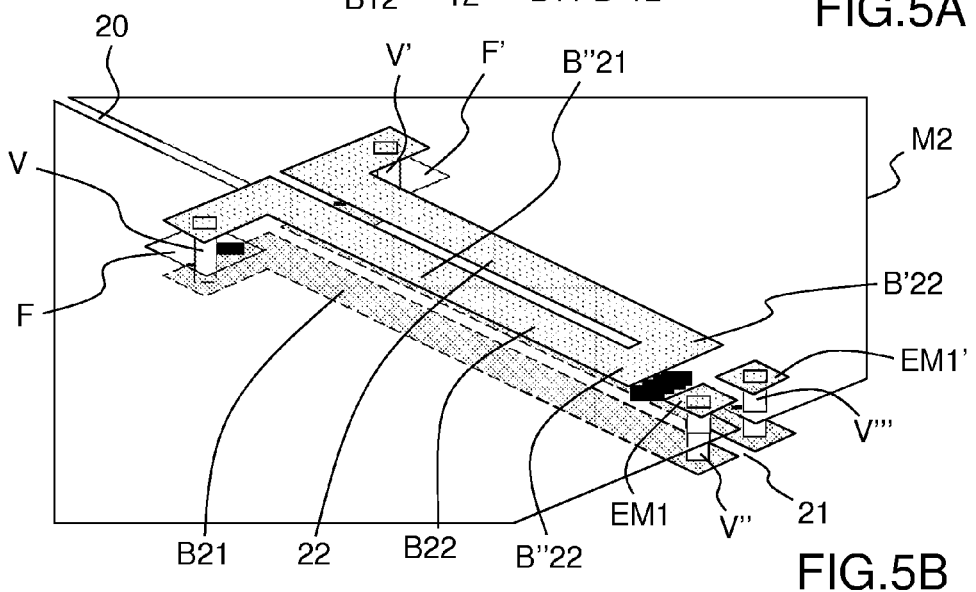

A description will now be given, with reference to FIG. 5(B), of a second embodiment of a slot antenna of electrical length λg/2. In this case, and as shown in the FIG. 4(B), a slot-line 20 is first etched in the intermediate conductive layer M2, the supply point 23 being realised as the supply point 13 of the embodiment of FIG. 4(A). In this case, a second slot-line 21 is realised in the lower conductive layer M3. As shown on FIG. 5(B), this slot-line 21 is delimited by two conductive strips B21, B'21. A third slot-line 22 is realised in the upper conductive layer M1. As shown in FIG. 5(B), this slot-line 22 is delimited by two conductive strips B22, B'22 that are interconnected on the opposite side to the supply point by a conductive element B"22 forming a slot-line in short-circuit. As in the embodiment of FIG. 5(A), the conductive strips have L-shapes. Moreover, as shown in the FIG. 5(B), the intermediate conductive layer M2 has two windows F, F' allowing passage for vias V, V' for the interconnection respectively of the conductive strip B21 with the conductive strip B22 and the conductive strip B'21 with the conductive strip B'22 at the level of the lower arm of the L-shaped part. Furthermore, an isolated conductive element EM1 and an isolated conductive element EM1' both realised in the first conductive layer M1 in the continuation, respectively, of the conductive strips B21 and B'21, are connected by vias V", V'" respectively to the second conductive layer M2 as well as, respectively, to the conductive strip B21 and to the conductive strip B'21 to obtain an interconnection of the slot-lines 20, 21, 22 as represented by the arrows in FIG. 4(B).

Figure 1:
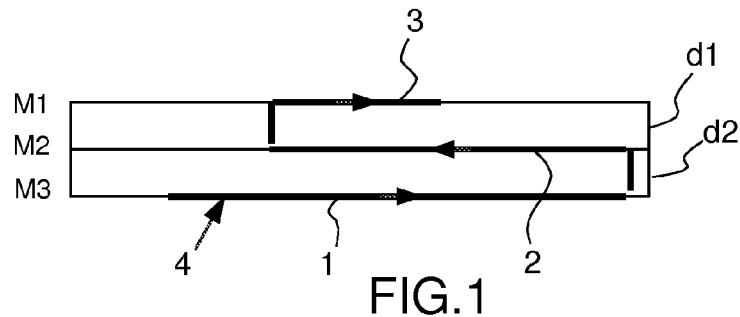
FIG. 1 already described is a cross-section view of an embodiment of a folded slot-antenna as naturally realised by those skilled in the art.
Figure 2:
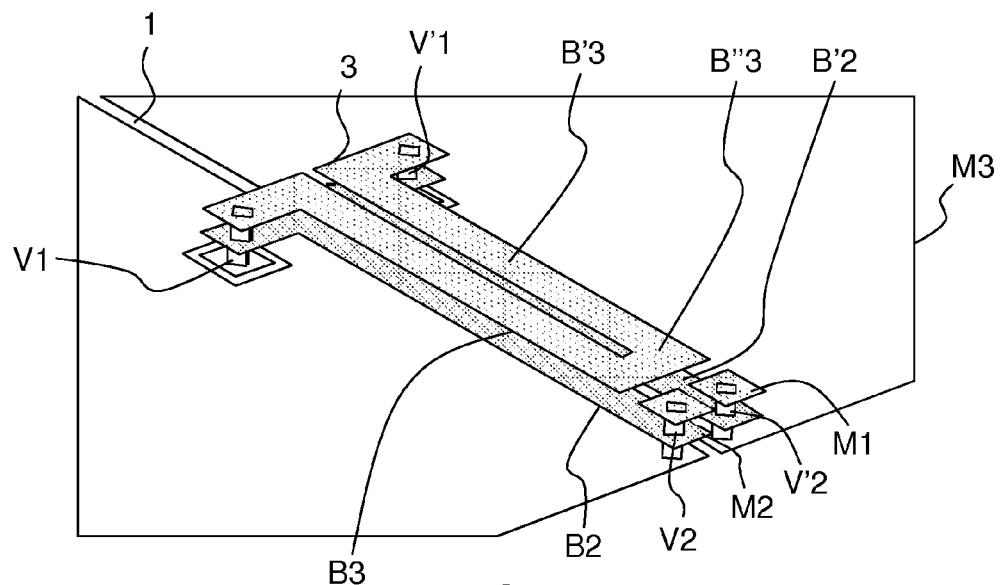
FIG. 2 already described is a diagrammatic perspective view of the antenna in FIG. 1.

These two structures have been simulated by using the same simulation method as the one use for the antenna shown in FIG. 2, the antennas of the FIGS. 4(A) and 4(B) having been realised on an identical substrate to the substrate shown in FIG. 1.

Figure 3:
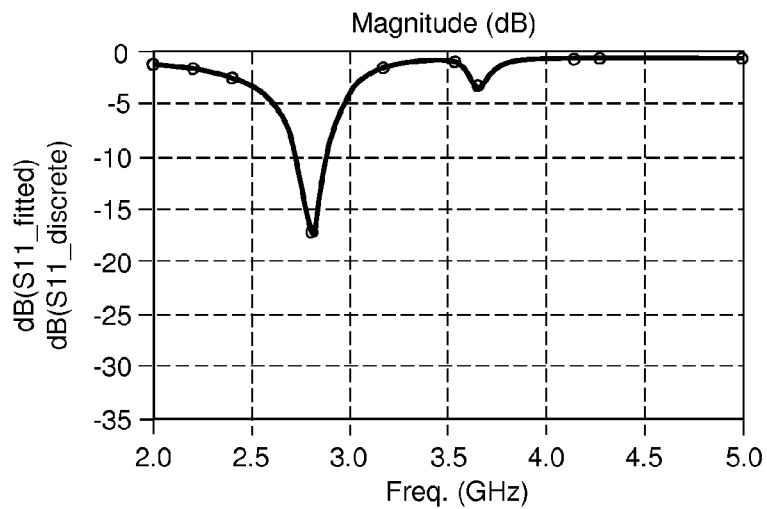
FIG. 3 already described shows, as a function of the frequency, the impedance matching in dB of the antenna shown in FIGS. 1 and 2.
Figure 6:
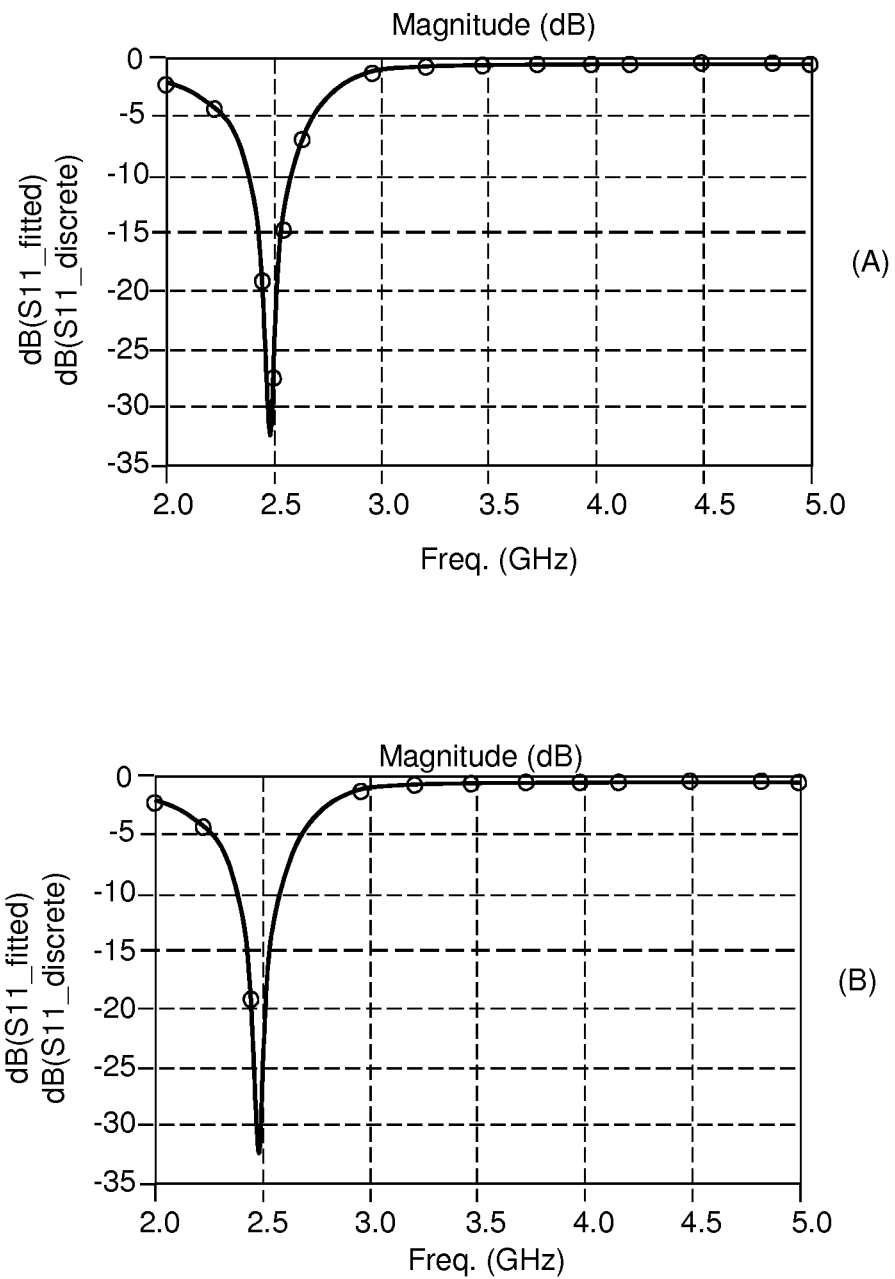
FIGS. 6(A) and (B) are curves giving the impedance matching as a function of the frequency of the slot-antennas shown in FIGS. 5(A) and (B).

In this case, the FIGS. 6(A) and 6(B) show the impedance matching curves as a function of the frequency of the slot-antennas of the FIGS. 5(A) and 5(B). It is seen that, in this case, the impedance matching curves show a resonance at a frequency of 2.5 GHz corresponding to the desired WiFi frequency. In relation to the curve of FIG. 3, it is observed in FIGS. 6A and 6B, the absence of spurious resonance, that is a response similar to a basic slot antenna, printed on a single layer. Moreover, in FIG. 3, the resonance frequency is higher than the resonance frequencies observed in FIGS. 6A and 6B, and this for a single total length of slot-line. At equal resonance frequency, both embodiments of the present invention thus involve a more reduced antenna size.

A description will now be given with reference to FIGS. 7 and 8 of a slot antenna having an electrical length of $\lambda g/4$.

Figure 7:
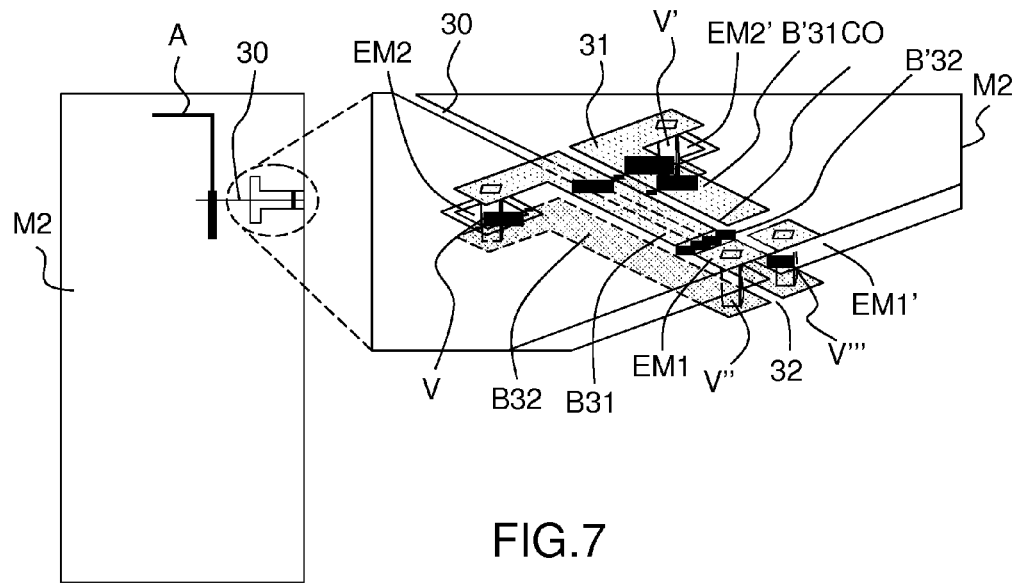
FIG. 7 shows, in a top and perspective views, another embodiment of a slot-antenna in accordance with the present invention.
Figure 8:
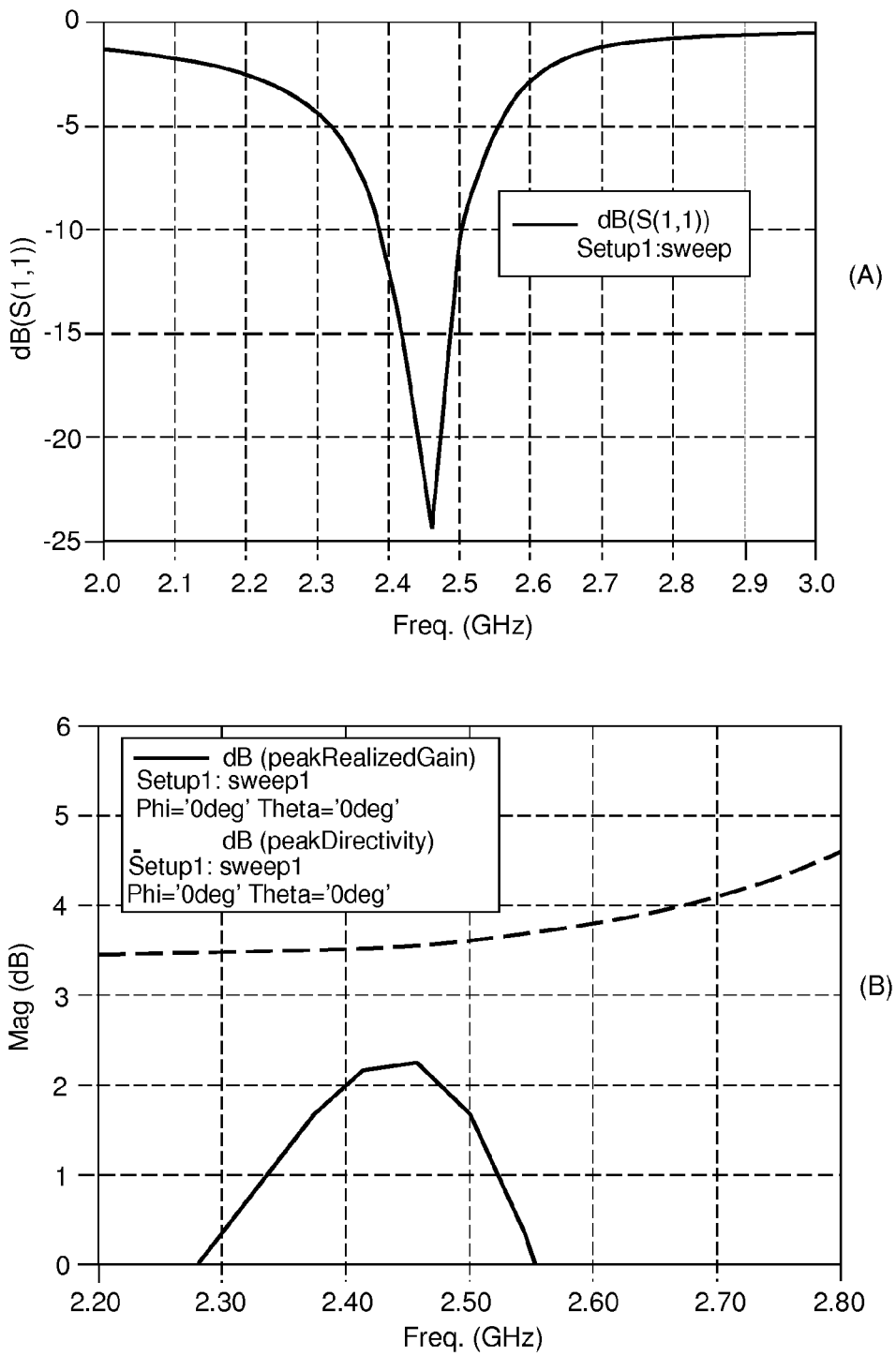
FIGS. 8(A) and (B) are respectively the impedance matching (A) and directivity and gain (B) curves as a function of the slot-antenna of FIG. 7.

As shown diagrammatically in the left part of the FIG. 7, a slot-line 30 is first realised in the intermediate conductive layer M2, this slot-line being supplied by a feeder line A realised in microstrip technology in the upper conductive layer M1 in such a manner as to realise an electromagnetic coupling, for example according to Knorr, with the slot-line 30.

As shown diagrammatically in the right-hand part of the FIG. 7, in the upper conductive layer M1 was realised a slot-line 31 delimited by two conductive strips B31, B'31. This slot-line 31 ends in an open circuit, as shown in the FIG. 7.

Furthermore, in the conductive layer M3, was realised a slot-line 32 delimited by two conductive strips B32 and B'32. The conductive strips B31, B'31, B32 and B'32 are all generally L-shaped to facilitate their interconnection.

As shown in FIG. 7, in the continuation of each conductive strip B31, B'31, was realised an isolated element respectively EM1 and EM1' in the conductive layer M1. This element EM1 and EM1' is connected by vias V" and V'" to the extremities of the conductive strips B31, B'31, these vias not being connected to the intermediate conductive layer M2. Furthermore, as shown in the FIG. 7, the other extremity of the conductive strips B32, B31, B'32, B'31 is connected by vias V and V' which are also connected to isolated elements EM2, EM2' of the intermediate conductive layer M2, cut in the main intermediate conductive layer M2, as shown in FIG. 7.

In this case, the total electrical length of the three slot-line elements 30, 31, 32 is equal to $\lambda g/4$ where $\lambda g$ is the wavelength at the operating frequency. A slot antenna of this type was simulated, by using the same criteria and the same tool as for the slot antennas shown in FIG. 2 or 5.

FIG. 8(A) shows the impedance matching curve according to the frequency of the slot-antenna shown in FIG. 7. This FIG. 8(A) shows a resonance for a frequency comprised between 2.4 and 2.5 GHz corresponding to the frequencies used in WiFi. The antenna has an impedance matching less than −10 dB in the operating band. Moreover, the antenna of FIG. 7 has a gain and directivity as shown in FIG. 8(B). The gain (around 2 dBi) and directivity (around 3.5 dBi) values obtained approach those of an non-folded slot-antenna.

Figure 9:
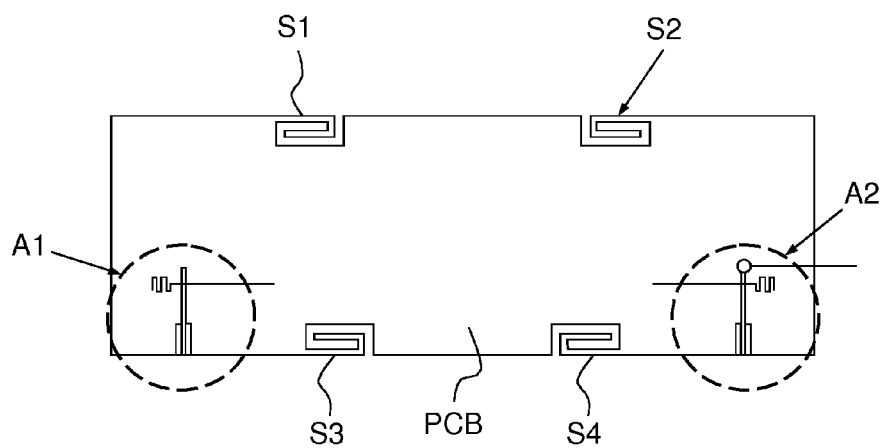
FIG. 9 is a diagrammatic view of a PCB circuit implementing antennas such as shown above.

A brief description will now be made with reference to FIG. 9, of the implementation of quarter wave slot-antennas folded as shown in FIG. 7, this implementation being used, for example, for a MIMO 2*2 application. On a printed circuit board noted as PCB, comprising a multilayer substrate with at least two dielectric layers separated by one conductive layer and two external conductive layers, two quarter wave antennas A1 and A2 have been realised, these antennas being isolated by slots S1, S2, S3, S4. The antennas of FIG. 9 can be realised on a circuit having dimensions of 40×120 mm. The performances of an antenna system realised with antennas such as shown in FIG. 9 in the 2.4-2.5 GHz band are as follows:

A level of loss less than −14 dB.
The antenna isolation is greater than 17 dB.
A directivity greater than 3 dBi and a gain close to 2 dBi.
A standard radiation pattern.

Owing to its compactness, the folded slot-antenna enables, among other advantages, a greater flexibility of positioning, orientation, on an electronic board, this to meet for example specific coverage requirements, or to avoid masking zones that the mechanical stresses inherent in a reduced size and low-cost electronic product frequently confer.

Hence, by using a specific folding of the slot-lines realised in a multilayer substrate, it is possible to obtain a compact slot-antenna whose physical length is much less than the total electrical length of the antenna.

The invention claimed is:

1. Compact slot-antenna formed, in a multilayer substrate comprising,
   in order, at least one first conductive layer, a first dielectric layer, a second conductive layer, a second dielectric layer and a third conductive layer,
   the slot-antenna being formed of a first slot-line realised in the second conductive layer, said first slot-line being connected to a supply of the antenna,
   the slot-antenna being further formed of a second slot-line and a third slot-line continuing from the first slot-line, and realised in the first and third conductive layers, the second and third slot-lines each being delimited respectively by two conductive strips, a first extremity, supply side, of a conductive strip of the second slot line being interconnected to a first extremity supply side of the corresponding conductive strip of the third slot line, by a via passing through a window realised in the second conductive layer,
   wherein the conductive strips of one of the second slot line and the third slot line at a second extremity are in open circuit and connected to the second conductive layer, and the conductive strips of the other of the second slot line and the third slot line at the second extremity are, in short circuit, the total electrical length of the first, second and third slot-lines being a function of the wavelength at the operating frequency of the antenna.

2. Slot-antenna according to claim 1, wherein the first, second and third slot-lines are superimposed.

3. Slot-antenna according to claim 1, wherein, when the total electrical length of the first, second and third slot-lines is equal to $k\lambda g/2$, k being an integer, one of the second or third slot-line is in short circuit.

4. Slot-antenna according to claim 1, wherein, when the total electrical length of the first, second and third slot-lines is equal to $k'\lambda g/4$, k' being an integer, one of the second or third slot-line is in short circuit.

5. Printed circuit board in which is realised at least one slot-antenna according to claim 1.

6. Printed circuit board according to claim 5, comprising at least two slot-antennas separated by isolating slots.

7. Terminal incorporating a printed circuit board according to claim 5.

* * * * *